(12) United States Patent
Chen et al.

(10) Patent No.: US 12,499,391 B2
(45) Date of Patent: Dec. 16, 2025

(54) MULTIVARIATE SOLID WASTE PROPORTION OPTIMIZATION METHOD BASED ON COUPLING OF MATRIX OPERATION AND MACHINE LEARNING

(71) Applicants: Tianjin University Of Commerce, Tianjin (CN); Tianjin University, Tianjin (CN)

(72) Inventors: Guanyi Chen, Tianjin (CN); Yunan Sun, Tianjin (CN); Junyu Tao, Tianjin (CN); Wenzhu Wu, Tianjin (CN); Shuang Wu, Tianjin (CN); Guandong Chen, Tianjin (CN); Chao Chen, Tianjin (CN)

(73) Assignees: Tianjin University Of Commerce, Tianjin (CN); Tianjin University, Tianjin (CN)

( * ) Notice: Subject to any disclaimer, the term of this patent is extended or adjusted under 35 U.S.C. 154(b) by 0 days.

(21) Appl. No.: 18/665,044

(22) Filed: May 15, 2024

(65) Prior Publication Data

US 2025/0190885 A1   Jun. 12, 2025

Related U.S. Application Data

(63) Continuation of application No. PCT/CN2024/070749, filed on Jan. 5, 2024.

(30) Foreign Application Priority Data

Dec. 12, 2023   (CN) .......................... 202311708147.1

(51) Int. Cl.
G06Q 20/00   (2012.01)
G06Q 10/04   (2023.01)
G06Q 10/30   (2023.01)

(52) U.S. Cl.
CPC ............. *G06Q 10/04* (2013.01); *G06Q 10/30* (2013.01)

(58) Field of Classification Search
CPC .............................. G06Q 10/04; G06Q 10/30
(Continued)

(56) References Cited

FOREIGN PATENT DOCUMENTS

| CN | 111195647 A | * | 5/2020 | ............... B09B 3/80 |
| CN | 116114567 A | * | 5/2023 | ............. A01G 24/00 |

OTHER PUBLICATIONS

Xue Foreign reference attached. (Year: 2023).*
Foreign Ref PDF added (Year: 2020).*

* cited by examiner

*Primary Examiner* — Dante Ravetti
(74) *Attorney, Agent, or Firm* — Pilloff Passino & Cosenza LLP; Rachel Pilloff; Sean Passino

(57) ABSTRACT

The disclosure provides a multivariate solid waste proportion optimization method based on a coupling of matrix operation and machine learning, including following steps: obtaining proportioning feedstock, where the proportioning feedstock include solid waste and boiler/industrial kiln working feedstock; using a machine learning model embedded optimization algorithm to obtain a set of characteristic parameter requirements of the proportioning feedstock; according to the set of characteristic parameter requirements of the proportioning feedstock, optimizing the blending ratio of the solid wastes and the boiler/industrial kiln working feedstock to obtain an optimized blending ratio of the solid wastes and the boiler/industrial kiln working feedstock; according to the optimized blending ratio of the solid wastes and the boiler/industrial kiln working feedstock, obtaining an optimized set of solid waste characteristic parameter requirements; completing solid waste proportion based on (Continued)

the optimized set of solid waste characteristic parameter requirements and the set of solid waste characteristic parameters.

4 Claims, 2 Drawing Sheets

(58) Field of Classification Search
USPC .......................................................... 705/308
See application file for complete search history.

MULTIVARIATE SOLID WASTE PROPORTION OPTIMIZATION METHOD BASED ON COUPLING OF MATRIX OPERATION AND MACHINE LEARNING

CROSS-REFERENCE TO RELATED APPLICATIONS

This application is a continuation of PCT/CN2024/070749, filed on Jan. 5, 2024 and claims priority of Chinese Patent Application No. 202311708147.1, filed on Dec. 12, 2023, the entire contents of which are incorporated herein by reference.

TECHNICAL FIELD

The disclosure belongs to a technical field of co-disposal of solid waste in industrial kilns, and in particular to a multivariate solid waste proportion optimization method based on a coupling of matrix operation and machine learning.

BACKGROUND

With the advancement of urbanization, the problem of urban solid waste discharge and disposal has become increasingly prominent. The municipal solid waste, municipal sludge and waste plastics discharged from urban domestic sources, industrial sludge, oily sludge and waste tires discharged from urban production sources, and municipal solid waste incineration fly ash, oil hazardous waste and medical waste discharged from urban hazardous waste sources are huge in total, wide in variety, complex in composition, wide in distribution and serious in harm, and their separate disposals are restricted by technology, equipment and investment. Various boilers/industrial kilns (coal-fired boilers, ironmaking blast furnaces and cement rotary kilns) in China have high temperature of 1000° C.-2000° C., complete pollutant removal system and high-capacity material flow, which is beneficial to the coordinated disposal of solid waste by the boilers/industrial kilns. On the one hand, it is capable of solving the problem of "not having enough to eat" in long-term low-load operation of the boilers/industrial kilns; and on the other hand, it is capable of solving the disposal problem of a large number of solid wastes.

However, there are the following difficulties in the process of co-disposal of municipal solid waste by the industrial kilns: first, the complexity of multi-source municipal solid waste and the difference of process characteristics of different industrial kilns require that comprehensive technical schemes must be adopted according to the physical and chemical characteristics and pollutant characteristics of solid waste to achieve compatible matching with kiln process system and thermal process; second, in view of the improvement of pollution control requirements caused by the coordinated disposal of municipal solid waste by industrial kilns, it is necessary to effectively control the characteristic pollutants such as dioxins and heavy metals caused by the coordinated disposal of solid waste in the whole process.

With regard to the research on the co-disposal of solid waste by industrial kilns, many developed countries began to use cement kilns to treat combustible waste in the 1970s and 1990s. In 1974, Lawrence Cement Factory in Canada first conducted an engineering application study on using waste lubricating oil as an alternative fuel for dry cement kilns. The disposal process had no adverse effects on the environment and cement quality, which proved the feasibility of co-disposal of solid waste and hazardous waste in cement kilns. For the research on the co-disposal of solid waste in industrial kilns in China, Xiao Haiping et al. found that under the condition of not changing the existing cement production equipment, the co-disposal of municipal solid waste fly ash by cement rotary kiln is capable of not only completely decomposing dioxins by using the high temperature of cement kiln, but also effectively solidifying heavy metal elements. At present, the types of co-disposal waste by cement enterprises in China mainly include municipal solid waste, sludge, solid waste and hazardous waste. In recent years, many cement enterprises, such as China National Building Material Group Co., Ltd., Anhui Conch Group Co., Ltd., Red Lion Holding Group Co., Ltd., BBMG Corporation, Huaxin Cement Co., Ltd., etc., have launched co-disposal production lines one after another. In 2020 alone, there are 37 co-disposal projects of hazardous wastes and solid wastes in cement kilns.

In addition, the technology of co-disposal of solid waste by coal-fired boiler and fluidized bed boiler in developed countries abroad has developed rapidly. The co-disposal wastes include biomass (poplar, sawdust, straw, orange peel, rice husk, etc.), Refuse Derived Fuel (RDF), sludge, dregs, petroleum coke, peat, plastics, waste tires and other wood wastes. At present, the installed capacity of thermal power in China is close to 1.1×109 KW, and the boilers of coal-fired power plants have basically achieved ultra-low emission transformation, and are widely distributed in the region, thus having the conditions for cooperative disposal of solid waste. Relying on the efficient power generation system and centralized pollutant treatment facilities of active coal-fired power stations, it is one of the ways to realize low-carbon and clean development of coal-fired power stations to implement the coupling power generation technology of coal-fired boilers and various solid wastes co-disposal. Many power plants in China have absorbed sludge, and power plant treatment facilities for sludge have been built in Jiangsu, Guangdong, Shandong, Zhejiang and other provinces. In addition to sludge, there are also many engineering tests and application cases at home and abroad in which coal-fired boilers in power plants co-disposal other kinds of solid wastes. Campbell et al. in Britain studied the co-combustion of textile waste and coal in circulating fluidized bed combustion chamber with different blending ratios. The University of Leeds studied the co-disposal of waste tire powder in the NOx reburning process of coal-fired boilers in power plants, and found that waste tire powder has better NOx reburning performance than pulverized coal.

The iron-making blast furnace is the main facility of modern iron-making. In 1995, Germany began to research and apply the co-disposal technology of solid waste by the iron-making blast furnace. Germany, Japan and other countries have successively developed blast furnace technology for treating electroplating sludge, chromium slag rotary kiln detoxification technology and mature plastic injection technology in blast furnace. Central South University found that the co-disposal of municipal solid waste fly ash incineration by the sintering machine had no negative impact on the sintering index and was slightly improved, and the generated flue gas could still be discharged in a standardized way through the conventional activated carbon system. Babich et al. from Germany, who co-disposed solid waste by the blast furnace, studied the reaction kinetics of co-disposed waste plastics by the blast furnace, and found that the physical properties (grain size, shape, porosity and specific surface area) of waste plastics had stronger influence on its transformation than the chemical properties. At present, domestic enterprises such as Baoshan Iron & Steel Co., Ltd., Wuhan Iron & Steel Co., Ltd. and Shandong Province Metallurgical Engineering Co., Ltd. have carried out research and engineering practice on solid waste co-disposal technology of various iron and steel smelting kilns.

At present, the research on the proportion method of organic solid waste is mostly in the laboratory stage, and the research method is mostly experimental inquiry. Under different experimental conditions, with different environmental and economic benefits as the goal, the optimal blending ratio is tested. Through the analysis of composition and proportion data, a small amount of sludge is used as an auxiliary material in most existing studies to reduce pollution, which is consistent with the conclusion of Conesa, Juan A that a small amount of sludge is capable of being used as an inhibitor of organic pollutants. However, due to various components, including kitchen waste, paper, rubber, plastics, metals, textiles, etc., and high carbon content and relatively high O/C atomic ratio, municipal solid waste has great combustion potential, so most municipal solid waste is used as the main material.

There are also some studies based on statistics, which use machine learning model to predict the blending ratio. These calculation methods or experimental studies have not got rid of the limitations of the laboratory, and there is still a gap with the engineering practice to some extent, as shown below.

First, various parameters in different boiler/industrial kilns operating conditions are not considered, such as different combustion temperatures and pollutant emission restrictions, and different boilers/industrial kilns have different requirements for some specific resources or energy sources (calorific value and moisture should be considered for coal-fired boilers, Cao content in cement rotary kilns and Fe content in iron-making blast furnaces should be considered).

Second, in the proportion, only the proportion between solid wastes is concerned, and the working feedstock of boiler/industrial kiln is not considered. Under actual working conditions, the working feedstock of boiler/industrial kiln is the main substance in boiler operation, but often only a small amount of solid wastes are studied in experiments, which leads to a small proportion of solid wastes added in the actual proportion of industrial kiln co-disposal of solid wastes at this stage.

Therefore, in view of the above difficulties, a proportion method of boiler/industrial kiln co-disposal of solid waste based on a mathematical relationship is proposed, which is closer to the actual working conditions.

SUMMARY

In order to solve the above technical problems, the disclosure provides a multivariate solid waste proportion optimization method based on a coupling of matrix operation and machine learning, thus considering various parameters in different boiler/industrial kiln operating conditions.

In order to achieve above objectives, the disclosure provides the multivariate solid waste proportion optimization method based on the coupling of matrix operation and machine learning, including following steps:

obtaining initial characteristic parameters and proportioning feedstock, where the proportioning feedstock include solid waste and boiler/industrial kiln working feedstock;

using a machine learning model embedded optimization algorithm to obtain a set of characteristic parameter requirements of the proportioning feedstock;

obtaining an optimal blending ratio of the proportioning solid wastes and the boiler/industrial kiln working feedstock according to a mathematical relationship between the set of the characteristic parameter requirements of the proportioning feedstock, characteristic parameter requirements of the solid wastes and characteristic parameters of the boiler/industrial kiln working feedstock;

obtaining an optimal set of solid waste characteristic parameter requirements according to the optimal blending ratio of the solid wastes and the boiler/industrial kiln working feedstock; and completing solid waste proportion based on the optimal set of the solid waste characteristic parameter requirements and a set of solid waste characteristic parameters.

Optionally, the initial characteristic parameters include:

the set of solid waste characteristic parameters, a set of the characteristic parameter requirements of the solid wastes and a set of characteristic parameter requirements of the boiler/industrial kiln working feedstock.

Optionally, obtaining the set of the characteristic parameter requirements of the proportioning feedstock includes:

constructing an initial machine learning model;

optimizing the initial machine learning model to obtain a final machine learning model;

based on the final machine learning model, combining with the optimization algorithm, and obtaining the set of the characteristic parameter requirements of the proportioning feedstock.

Optionally, steps of obtaining the final machine learning model include:

carrying out data preprocessing on the proportioning feedstock, training the initial machine learning model by using preprocessed data, and then carrying out a cross-validation on the models to obtain optimal hyperparameters of an algorithm; and obtaining the final machine learning model based on the obtained optimal hyperparameters and by combining input parameters and output performance indexes of the initial machine learning model.

Optionally, based on the final machine learning model and combining with the optimization algorithm, obtaining the set of the characteristic parameter requirements of the proportioning feedstock includes:

obtaining a preset search space according to boundary conditions of the input parameters; and according to the final machine learning model, using the optimization algorithm and a heuristic search strategy, automatically searching in the preset search space, and obtaining the set of the characteristic parameter requirements of the proportioning feedstock through iteration.

Optionally, obtaining an optimized blending ratio includes:

constructing a blending ratio formula according to the set of characteristic parameter requirements of the proportioning feedstock, the set of the characteristic parameter requirements of the solid wastes and the set of characteristic parameter requirements of the boiler/industrial kiln working feedstock;

substituting a maximum value and a minimum value of each subset in the set of the characteristic parameter requirements of the solid wastes and a corresponding subset in the set of characteristic parameter requirements of the boiler/industrial kiln working feedstock into the blending ratio formula, and optimizing the set of the characteristic parameter requirements of the solid wastes and the set of characteristic parameter requirements of the boiler/industrial kiln working feedstock to obtain the optimized blending ratio.

Optionally, the blending ratio formula is:

$$XW + (1 - X)C = Z,$$

X represents a proportion of total solid waste in proportioning feedstock, and the unit is %; W represents the set of the characteristic parameter requirements of the solid wastes; C represents the set of characteristic parameter requirements of a boiler/industrial kiln working feedstock; and Z represents the set of characteristic parameter requirements of the proportioning feedstock.

Optionally, based on the optimal set of the optimal solid waste characteristic parameter requirements and the set of the solid waste characteristic parameters, completing the solid waste proportion includes:

obtaining a set of solid waste blending ratio according to the optimal set of the solid waste characteristic parameter requirements and the set of the solid waste characteristic parameters; and obtaining an allowable solid waste blending ratio range according to the maximum and minimum values of the set of solid waste blending ratio and the optimal set of the solid waste characteristic parameter requirements, and completing the solid waste proportion.

Compared with the prior art, the disclosure has following advantages and technical effects.

(1) The disclosure provides a multivariate solid waste proportion optimization method based on the coupling of matrix operation and machine learning, which considers various parameter requirements between boiler/industrial kiln working feedstock and the solid waste, and is closer to the proportion in actual working conditions.

(2) The disclosure optimizes the proportion method of multivariate solid waste co-disposal in industrial kilns, which ensures the product quality of boilers/industrial kilns and reduces the emission of pollutants on the basis of meeting national and industrial standards.

(3) The disclosure provides a new idea of proportion, and in the process of solid waste proportion, it is necessary to combine the original work conditions, and consider calorific value, moisture, corrosive elements, heavy metal content, low melting point components and other resource or energy requirements.

(4) On the basis of ensuring the normal operation of the boiler/industrial kiln, the disclosure aims to improve the utilization rate of solid waste resources, improve the proportion accuracy and ensure the energy utilization or resource utilization efficiency of the boiler/industrial kiln.

BRIEF DESCRIPTION OF THE DRAWINGS

The accompanying drawings, which constitute a part of this application, are used to provide a further understanding of the disclosure. The illustrative embodiments and descriptions thereof are used to explain the disclosure and do not constitute undue limitations on the disclosure. In the attached drawings.

DETAILED DESCRIPTION OF THE EMBODIMENTS

It should be noted that the embodiments in the disclosure and the features in the embodiments is capable of being combined with each other without conflict. The present disclosure is described in detail with reference to the attached drawings and embodiments.

It should be noted that the steps shown in the flowchart of the accompanying drawings may be executed in a computer system such as a set of computer-executable instructions, and although the logical order is shown in the flowchart, in some cases, the steps shown or described may be executed in a different order from here.

This embodiment proposes a multivariate solid waste proportion optimization method based on a coupling of matrix operation and machine learning, which includes following steps:

1. Determining the Proportioning Feedstock

Before determining the proportioning feedstock, the types of boilers/industrial kilns should be confirmed, and the types of co-processing solid wastes should be selected according to the furnace types of boilers/industrial kilns. For co-processing solid wastes in coal-fired boilers, reference should be made to DL/T 1339, reference should be made to GB/T 18512 and GB/T 10322.6 in ironmaking blast furnaces, and reference should be made to DB44/T 882, HJ 662 and GB/30760 in cement rotary kilns.

2. Proportion Method

Figure 1:
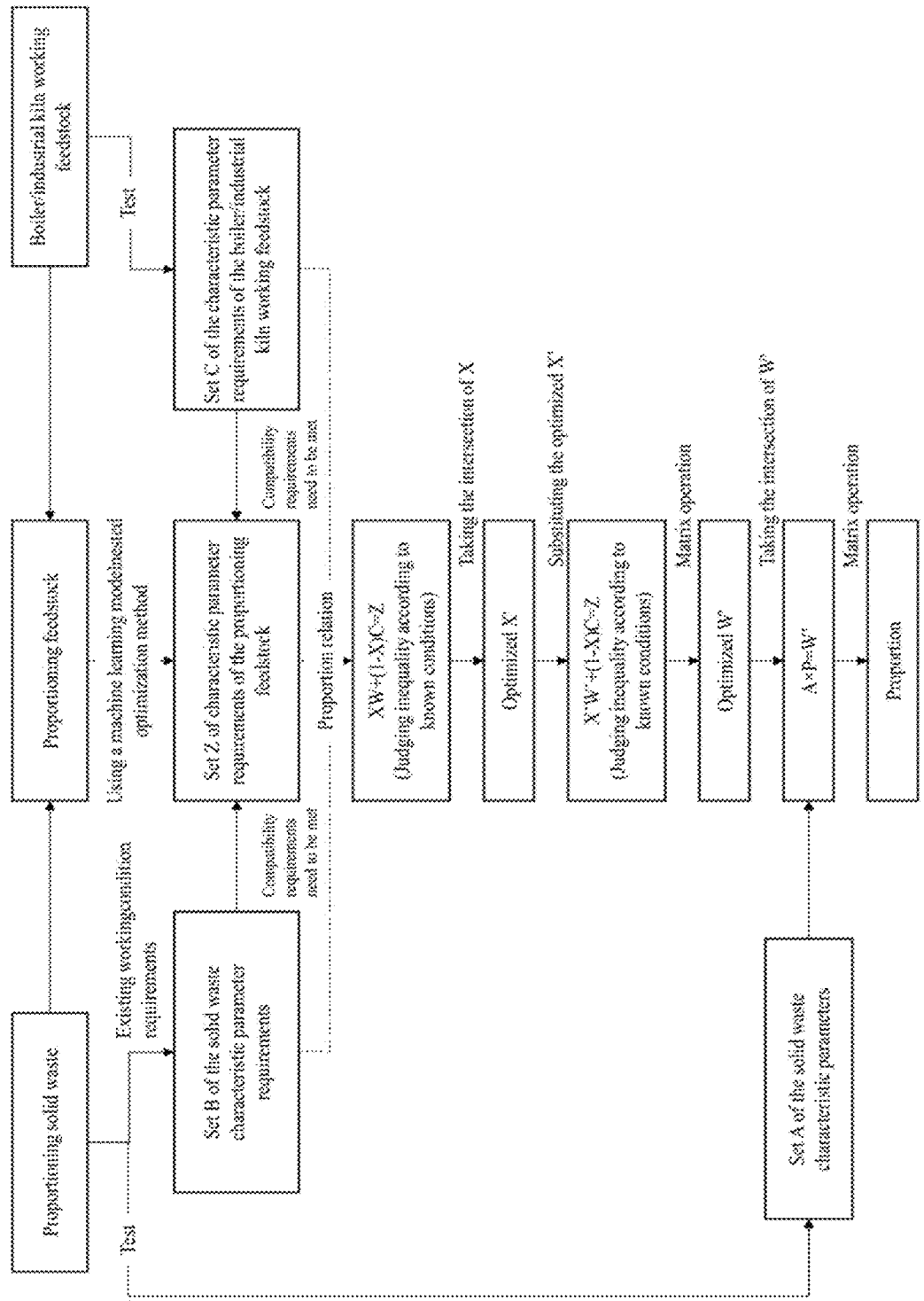
FIG. 1 is a flowchart of a multivariate solid waste proportion optimization method based on a coupling of matrix operation and machine learning according to an embodiment of the present disclosure.
Figure 2:
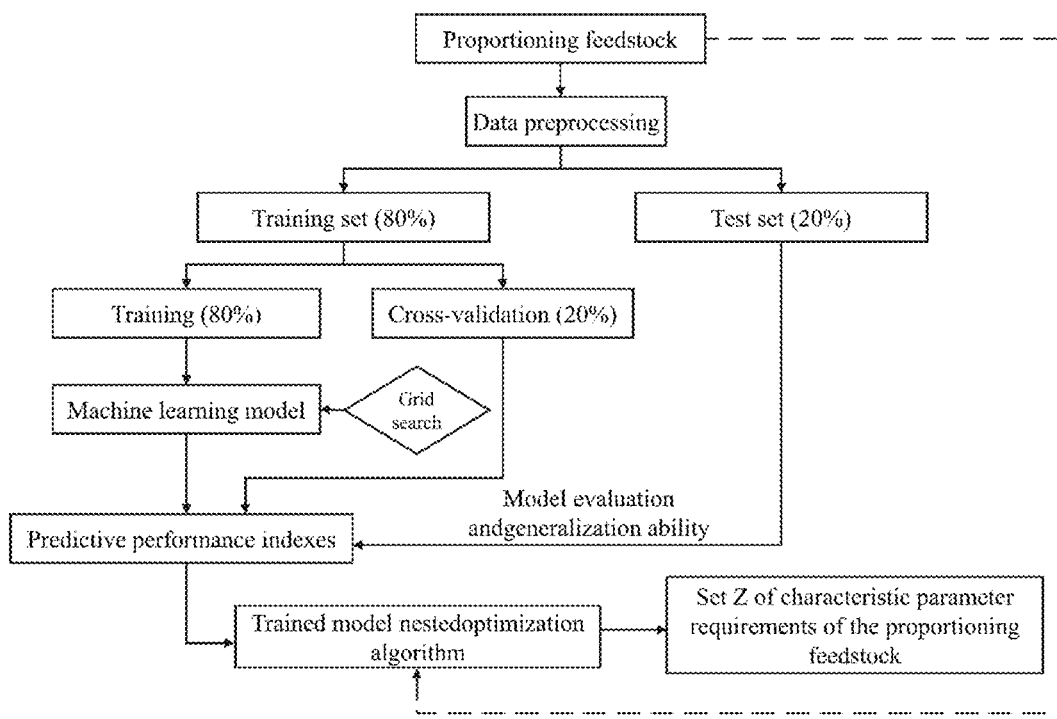
FIG. 2 is a flowchart of a machine learning model embedded optimization algorithm according to an embodiment of the present disclosure.

After confirming the proportioning feedstock, testing basic characteristics of the solid wastes in the proportioning feedstock to obtain a set A of the solid waste characteristic parameters;

taking a situation of adding solid waste in the existing working conditions as an example to test basic characteristics of the added solid waste in many examples, and obtaining a range set W of solid waste characteristic parameter requirements;

expressing characteristic parameter requirements of boiler/industrial kiln working feedstock by parameters of the boiler/industrial kiln working feedstock under normal conditions, and testing basic characteristics of the boiler/industrial kiln working feedstock to obtain a set C of parameter requirements of the boiler/industrial kiln working feedstock;

using a machine learning model, embedded optimization algorithm and heuristic search to obtain a set Z of characteristic parameter requirements of the proportioning feedstock;

optimizing a blending ratio of solid waste and boiler/industrial kiln working feedstock to make the proportioning feedstock meet requirements of characteristic parameters; in order to meet all solid waste characteristic parameter requirements W, widening the blending ratio, and further optimizing the solid waste characteristic parameter requirements with the latest blending ratio, so that a specific blending ratio between the solid waste is capable of being obtained through the solid waste characteristic parameters and the parameter requirements. The process is shown in FIG. 1.

3. Determining the Basic Characteristic Parameters 3.1 Defining "Solid Waste Characteristic Parameters" as a Set A The solid waste characteristic parameters include calorific value, moisture content, sulfur content, chlorine content, heavy metal content (lead, zinc, copper, chromium, nickel, manganese, cadmium, arsenic, etc.), low melting point components (potassium oxide, sodium oxide, magnesium oxide, etc.) and other characteristic parameters.

The solid waste should be tested for calorific value, industrial analysis, elemental analysis, heavy metal content test, chemical composition analysis, mineral composition analysis, etc. During the test, each test item shall be repeated three times or more, and the average of the single test item results of the same solid waste shall be taken as the final test result.

The solid waste characteristic parameters are summarized to form the set A, which is specifically expressed as follows:

$$A = \begin{bmatrix} a_{11} & a_{12} & a_{13} & a_{14} & \ldots & a_{1n} \\ a_{21} & a_{22} & a_{23} & a_{24} & \ldots & a_{2n} \\ a_{31} & a_{32} & a_{33} & a_{34} & \ldots & a_{3n} \\ a_{41} & a_{42} & a_{43} & a_{44} & \ldots & a_{4n} \\ \ldots & \ldots & \ldots & \ldots & \ldots & \ldots \\ a_{n1} & a_{n2} & a_{n3} & a_{n4} & \ldots & a_{nn} \end{bmatrix}, \quad (1)$$

where A represents the set of solid waste characteristic parameters; rows in the set A represent unified characteristic parameter data of different solid wastes, and columns represent different characteristic parameter data of a same solid waste. For example, $a_{42}$ represents a specific value of the fourth characteristic parameter concerned by the second solid waste, and $a_{43}$ represents a specific situation of the fourth characteristic parameter concerned by the third solid waste.

3.2 Defining "Solid Waste Characteristic Parameter Requirements" as a Set W

The solid waste characteristic parameter requirements shall be consistent with solid waste characteristic parameters. Taking the selection and dosage ratio of solid wastes in practical engineering application as an example, the characteristic parameters shall be tested. The specific test items and methods are the same as those in 3.1.

The blending ratio of solid waste under different conditions in practical engineering applications is multiplied by the corresponding data of different characteristic parameters to form the set W of the solid waste characteristic parameter requirements, as follows:

$$W = \begin{bmatrix} W_1 \\ W_2 \\ W_3 \\ W_4 \\ \ldots \\ W_n \end{bmatrix}, \quad (2)$$

where W represents the set of the solid waste characteristic parameter requirements; $W_1, W_2 \ldots W_n$ represent required ranges of different characteristic parameters;

3.3 Defining "Characteristic Parameter Requirements of the Boiler/Industrial Kiln Working Feedstock" as a Set C Based on the characteristic parameter requirements of the boiler/industrial kiln working feedstock, the basic characteristics of working feedstock materials under normal working conditions of the boiler/industrial kiln in practical engineering applications are tested. The specific test items and methods are the same as those in 3.1.

The blending ratio of the boiler/industrial kiln working feedstock in practical engineering application is multiplied by the test data of its different basic characteristics, the set C of the characteristic parameter requirements of the boiler/industrial kiln working feedstock is obtained, as follows:

$$C = \begin{bmatrix} c_1 \\ c_2 \\ c_3 \\ c_4 \\ \ldots \\ c_n \end{bmatrix}, \quad (3)$$

where C represents the set of the characteristic parameter requirements of the boiler/industrial kiln working feedstock; $c_1, c_2 \ldots c_n$ represent different characteristic parameter requirements of the boiler/industrial kiln working feedstock;

4. Determining the Set Z of Characteristic Parameter Requirements of the Proportioning Feedstock 4.1 Acquisition Method of the Set Z Under the condition of meeting the corresponding national standards, the Z set of characteristic parameter requirements of the proportioning feedstock is obtained by using the method of machine learning model embedded the optimization algorithm, and the specific steps are shown in FIG. 1.

4.2 Data Preprocessing and Machine Learning Model Construction

Data preprocessing and machine learning model construction are carried out. Following key steps are included:

(1) Data collection: collecting data related to industrial kiln process, including input parameters such as calorific value, moisture content, corrosive elements, heavy metal content, mineral composition and others, and product concentration as output.

(2) Data cleaning: cleaning the data, and dealing with missing and abnormal values to ensure the quality and accuracy of the data.

(3) Feature engineering: carrying out feature engineering, including feature selection, creating interactive items or other feature engineering skills, so as to make better use of the input parameters.

(4) Data standardization: carrying out data standardization or normalization on input parameters to ensure a balance of weights among different features.

(5) Model construction: constructing three different machine learning models, including Artificial Neural Network (ANN), Support Vector Regression (SVR) and Random Forest (RF) to predict the product concentration.

4.3 Model Performance Optimization and Selection

The optimization and selection of model performance includes following key steps:

(1) Hyperparameter adjustment: selecting appropriate hyperparameters, such as the number of hidden layers and the neuron configuration (for ANN), the kernel function and the regularization parameters (for SVR), and the number and depth of decision trees (for RF).

(2) Model training and cross-validation: training each model, and evaluating the performance of the models by the cross-validation, so as to obtain a best combination of hyperparameters and improve the accuracy of the models.

(3) Performance indicators: paying attention to performance indicators of the models, such as Mean Relative Error (MRE)/Root Mean Square Error (RMSE), to ensure that the selected model provides the best product concentration prediction accuracy.

(4) Optimal model selection: finally, selecting the model most suitable for the problem, and ensuring the accuracy of the optimal product concentration prediction.

4.4 Embedded Optimization Algorithm and Heuristic Search

Using the found final model, embedding the optimization algorithm, according to the input and output boundary conditions, automatically searching in a specific area to find the best combination of process conditions. Following key processes are included:

(1) Selection of optimization algorithm: selecting an appropriate optimization algorithm for searching the best process conditions in the multi-dimensional parameter space, such as gradient descent, genetic algorithm, particle swarm optimization or other heuristic algorithms.

(2) Definition of boundary conditions: boundary conditions refer to clearly defining the boundary conditions of the input parameters within the range of characteristic parameters of the above solid waste, the boiler/industrial kiln working feedstock and the proportioning feedstock, such as maximum and minimum values of input calorific value, moisture, sulfur content, chlorine content and heavy metal zinc content; the output of maximum and minimum values of heavy metal lead content is capable of limiting the search space, ensure the process conditions within the acceptable range, and ensure the feasibility of process implementation.

(3) Heuristic search: the optimization algorithm uses the heuristic search strategy to automatically search the best combination of process conditions according to the product concentration and boundary conditions predicted by the model, similar to the problem of finding the global optimal solution in the multi-dimensional space.

(4) Automatic iteration: the algorithm includes multiple model trainings and evaluations to continuously improve the proposal of process conditions. In each iteration, the algorithm tries different combinations of input parameters and transmits them to the trained model, and evaluates the quality of the solution according to the predicted product concentration and boundary conditions until the best combination of process conditions satisfying the optimization goal is found.

Finally, the set Z of characteristic parameter requirements of the proportioning feedstock is obtained through iteration, as follows:

$$Z = \begin{bmatrix} z_1 \\ z_2 \\ z_3 \\ z_4 \\ \ldots \\ z_n \end{bmatrix}, \quad (4)$$

where Z represents the set of characteristic parameter requirements of the proportioning feedstock; $z_1, z_2 \ldots z_n$ represent the characteristic parameter requirements of the proportioning feedstock;

5. Calculating an Optimized Total Blending Ratio Range X'

The calculation of the set Z of characteristic parameter requirements of the proportioning feedstock, the set W of the solid waste characteristic parameter requirements and the set C of the characteristic parameter requirements of the boiler/industrial kiln working feedstock are calculated according to formula (5).

$$XW + (1 - X)C = Z, \quad (5)$$

where X represents a proportion of total solid waste in the proportioning feedstock, the unit is %; W represents the set of the solid waste characteristic parameter requirements; C represents the set of the characteristic parameter requirements of the boiler/industrial kiln working feedstock; Z represents the set of the characteristic parameter requirements of the proportioning feedstock;

the set W of the solid waste characteristic parameter requirements is a range set. In order to obtain the proportion X of total solid waste in the proportioning feedstock, the maximum and minimum values of each subset in the set are calculated and substituted into the calculation formulas (6), (7), (8) and (9) and (10).

$$XW_1 + (1 - X)c_1 \geq z_1 \quad (6)$$

$$XW_2 + (1 - X)c_2 \leq z_2 \quad (7)$$

$$XW_3 + (1 - X)c_3 \leq z_3 \quad (8)$$

$$XW_4 + (1 - X)c_4 \leq z_4 \quad (9)$$

$$XW_n + (1 - X)c_n \leq z_n \text{ Or } (10)XW_n + (1 - X)c_n \geq z_n, \quad (10)$$

and the following is obtained:

when $W_{1max} \geq c_1 \geq W_{1min}$, $\dfrac{Z_1 - C_1}{W_{1max} - c_1} \leq X \leq \dfrac{Z_1 - C_1}{C_1 - W_{1min}}$;

when $c_1 \geq W_{1max} \geq W_{1min}$, $X \leq \dfrac{Z_1 - C_1}{C_1 - W_{1min}}$;

when $W_{1max} \geq W_{1min} \geq c_1$, $\dfrac{Z_1 - C_1}{W_{1min} - c_1} \leq X$;

in a similar way:

when $W_{2/3/4max} \geq c_{2/3/4} \geq W_{2/3/4min}$, $\dfrac{Z_{2,3,4} - C_{2,3,4}}{c_{2,3,4} - W_{2,3,4min}} \leq X \leq \dfrac{Z_{2,3,4} - C_{2,3,4}}{W_{2,3,4max} - c_{2,3,4}}$;

when $c_{2/3/4} \geq W_{2/3/4max} \geq W_{2/3/4min}$, $X \leq \dfrac{C_{2,3,4} - Z_{2,3,4}}{c_{2,3,4} - W_{2,3,4max}}$;

when $W_{2/3/4max} \geq W_{2/3/4min} \geq c_{2/3/4}$, $\dfrac{Z_{2,3,4} - C_{2,3,4}}{W_{2,3,4max} - c_{2,3,4}} \leq X$.

To sum up, in order to meet all characteristic parameter requirements in the boiler/industrial kiln at the same time, the optimized total blending ratio range X' is obtained by taking the intersection of the proportion X of total solid waste in the proportioning feedstock under the conditions of various parameter requirements.

6. Calculating Characteristic Parameter Requirements W' of the Solid Wastes

The optimized total blending ratio range X' is substituted into (11):

$$X'W' + (1 - X')C = Z, \quad (11)$$

where X' represents the optimized total blending ratio range, the unit is %; W' represents a set of optimized solid waste characteristic parameters; C represents the set of the characteristic parameter requirements of the boiler/industrial kiln working feedstock; Z represents the set of the characteristic parameter requirements of the proportioning feedstock;

and the following is obtained:

$$W' = \frac{Z - C}{X'} + C. \quad (12)$$

To sum up, by substituting X' into (12), the range set of optimized characteristic parameter requirements W' of the solid wastes is obtained.

7. Calculating a Set P of Allowable Blending Ratio Range Between Solid Wastes

The mixing between solid wastes is related to formulas (13) and (14), the range set of optimized characteristic parameter requirements W' of the solid wastes is substituted, and the set P is obtained by an inverse matrix operation (15).

$$A \cdot P = W', \quad (13)$$

where P represents the set P of blending ratio of the solid wastes, and the unit is %; A represents the set of basic characteristic parameters A of the solid wastes; W' represents the set of optimized solid waste characteristic parameter requirements;

expanding formula (13) to obtain:

$$\begin{bmatrix} a_{11} & a_{12} & a_{13} & a_{14} & \ldots & a_{1n} \\ a_{21} & a_{22} & a_{23} & a_{24} & \ldots & a_{2n} \\ a_{31} & a_{32} & a_{33} & a_{34} & \ldots & a_{3n} \\ a_{41} & a_{42} & a_{43} & a_{44} & \ldots & a_{4n} \\ \ldots & \ldots & \ldots & \ldots & \ldots & \ldots \\ a_{n1} & a_{n2} & a_{n3} & a_{n4} & \ldots & a_{nn} \end{bmatrix} \begin{bmatrix} p_1 \\ p_2 \\ p_3 \\ p_4 \\ \ldots \\ p_n \end{bmatrix} = \begin{bmatrix} W'_1 \\ W'_2 \\ W'_3 \\ W'_4 \\ \ldots \\ W'_n \end{bmatrix}, \quad (14)$$

where $a_{xy}$ represents a basic parameter corresponding to the x characteristic parameter of the y type of solid waste, and the unit is %; $p_n$ represents the proportion of different solid wastes in the proportioning feedstock, and the unit is %; $W_n'$ represents the different solid waste characteristic parameter requirements;

$$P = A^- \cdot W', \quad (15)$$

where P represents the set I of blending ratio of the solid wastes, and the unit is %; $A^-$ represents an inverse matrix of basic characteristic parameters A of the solid wastes: W' represents; the set of optimized solid waste characteristic parameter requirements;

The set W' is substituted into formula (15), and the maximum and minimum values are taken respectively to obtain the allowable blending ratio range P between solid wastes.

Embodiment

Step 1: Determining the Proportioning Feedstock

The proportioning feedstock are municipal sludge, fly ash from waste incineration and working feedstock of boiler/industrial kiln. For the co-disposal of solid waste in cement kiln, refer to DB44/T 882, HJ 662 and GB/T 30760, because fly ash from waste incineration contains a large number of insoluble substances such as Ca, Si, Al and Fe, which are similar to high-quality lime and are capable of replacing lime. Municipal sludge contains a large number of organic components, and the combustible components account for a high proportion. Its low calorific value of dry base, lean coal and inferior lignite provide heat for the cement firing process. In summary, two solid wastes, fly ash from waste incineration and municipal sludge, are selected as the proportioning feedstock.

Step 2: Determining the Types of Characteristic Parameters

Considering the influence of various parameters in proportioning feedstock on the normal operation and product quality of boilers/industrial kilns and the total amount of experimental data, the following characteristic parameters are selected as examples: calorific value, moisture, sulfur content, chlorine content, heavy metal zinc content and heavy metal lead content.

Step 3: Determining Various Characteristic Parameter Sets

1. Determining a Set A of the Solid Waste Characteristic Parameters

According to the characteristic parameters, such as calorific value, moisture, sulfur content, chlorine content, heavy metal zinc content and heavy metal lead content, the calorific value of municipal sludge comes from literature research and is obtained by taking the average value. The fly ash from waste incineration belongs to inorganic material, the calorific value is 0, but for the convenience of calculation, the value is 1. Other data sources are elemental analysis, industrial analysis and heavy metal content test of municipal sludge and fly ash from waste incineration. Elemental analysis and industrial analysis data are obtained by an elemental analyzer (Elemantar: Vario EL cube) and an industrial analyzer (5E-MAG6700) respectively, and heavy metal content test data are obtained by inductively coupled plasma source mass spectrometer (ICP-MS), as follows:

$$A = \begin{bmatrix} a_{11} & a_{12} \\ a_{21} & a_{21} \\ a_{31} & a_{32} \\ a_{41} & a_{42} \\ a_{51} & a_{52} \\ a_{61} & a_{62} \end{bmatrix} = \begin{bmatrix} 13335.7 & 1 \\ 12.1 & 5.78 \\ 0.96 & 2.46 \\ 0.15 & 20.41 \\ 1580.2 & 2267.7 \\ 27.3 & 298.2 \end{bmatrix},$$

where $a_{n1}$ and $a_{n2}$ represent different types of solid wastes, 1 represents municipal sludge, and 2 represents fly ash from waste incineration; $a_{1n}$ represents a calorific value characteristic parameter of sludge and fly ash from waste incineration, and the unit is kJ/kg; $a_{2n}$ represents a moisture content characteristic parameter of sludge and fly ash from waste incineration, and the unit is %; $a_{3n}$ represents a sulfur content characteristic parameter in sludge and fly ash from waste incineration, and the unit is %; $a_{4n}$ represents a chlorine content characteristic parameter in sludge and fly ash from waste incineration, and the unit is %; $a_{5n}$ represents a characteristic parameter of heavy metal zinc content in sludge and fly ash from waste incineration, and the unit is mg/kg; and $a_{6n}$ represents a characteristic parameter of heavy metal lead content in sludge and fly ash from waste incineration, and the unit is mg/kg;

2. Determining the Solid Waste Parameter Set W

Solid waste characteristic parameter requirements are obtained by multiplying the characteristic parameters of municipal sludge and fly ash from waste incineration by the corresponding dosing ratio range, as follows:

$$W = \begin{bmatrix} W_1 \\ W_2 \\ W_3 \\ W_4 \\ W_5 \\ W_6 \end{bmatrix} = \begin{bmatrix} 133.36 \sim 13335.7 \\ 0.0578 \sim 12.1 \\ 0.0096 \sim 2.46 \\ 0.0015 \sim 20.41 \\ 15.802 \sim 2267.7 \\ 0.273 \sim 298.2 \end{bmatrix},$$

where W represents the set of characteristic parameter requirements; $W_1$ represents a required range of calorific value in the solid wastes, and the unit is kJ/kg; $W_2$ represents a required range of moisture content in the solid wastes, and the unit is %; $W_3$ represents a required range of sulfur content in the solid wastes, and the unit is %; $W_4$ represents a required range of chlorine content in the solid wastes, and the unit is %; $W_5$ represents a required range of heavy metal zinc content in the solid wastes, and the unit is mg/kg; $W_6$ represents the required range of heavy metal lead content in the solid wastes, and the unit is mg/kg;

3. Determining a Set C of Parameter Requirements of the Boiler/Industrial Kiln Working Feedstock Because of the problem of total data, coal is used as the main working feedstock of boiler/industrial kiln in this embodiment, and comprehensive tests should be carried out in actual engineering according to the requirements of the disclosure, as follows:

$$C = \begin{bmatrix} c_1 \\ c_2 \\ c_3 \\ c_4 \\ c_5 \\ c_6 \end{bmatrix} = \begin{bmatrix} 29307.6 \\ 2.18 \\ 0.972 \\ 0.001 \\ 0.00139 \\ 0.03439 \end{bmatrix},$$

where C represents the set of characteristic parameter requirements; $c_1$ represents a calorific value requirement of the boiler/industrial kiln working feedstock, and the unit is kJ/kg; $c_2$ represents a moisture content requirement of the boiler/industrial kiln working feedstock, and the unit is %; $c_3$ represents a sulfur content requirement in the boiler/industrial kiln working feedstock, and the unit is %; $c_4$ represents a chlorine content requirement in the boiler/industrial kiln working feedstock, and the unit is %; $c_5$ represents a requirement of heavy metal zinc content in the boiler/industrial kiln working feedstock, and the unit is mg/kg; $c_6$ represents a requirement of heavy metal lead content in the boiler/industrial kiln working feedstock, and the unit is mg/kg.

Step 4, Determining a Set Z of Characteristic Parameter Requirements of the Proportioning Feedstock 1. Data Preprocessing and Machine Learning Model Construction Data preprocessing and machine learning model construction are carried out. Following key steps are included:

(1) Data collection: using experimental data as the data set in this embodiment, including input parameters such as calorific value, moisture content, sulfur content, chlorine content, heavy metal zinc content and heavy metal lead content, and product concentration as the output.

(2) Data cleaning: cleaning the data, and dealing with missing and abnormal values to ensure the quality and accuracy of the data.

(3) Feature engineering: carrying out feature engineering, including feature selection, creating interactive items or other feature engineering skills, so as to make better use of the input parameters.

(4) Data standardization: carrying out data standardization or normalization on input parameters to ensure a balance of weights among different features.

(5) Model construction: constructing three different machine learning models, including Artificial Neural Network (ANN), Support Vector Regression (SVR) and Random Forest (RF) to predict the product concentration.

2. Model Performance Optimization and Selection

The optimization and selection of model performance includes following key steps:

(1) Hyperparameter adjustment: selecting appropriate hyperparameters, such as the number of hidden layers and the neuron configuration (for ANN), the kernel function and the regularization parameters (for SVR), and the number and depth of decision trees (for RF).

(2) Model training and cross-validation: training each model, and evaluating the performance of the models by the cross-validation, so as to obtain a best combination of hyperparameters and improve the accuracy of the models.

(3) Performance indicators: paying attention to performance indicators of the models, such as Mean Relative Error (MRE)/Root Mean Square Error (RMSE), to ensure that the selected model provides the best product concentration prediction accuracy.

(4) Optimal model selection: finally, selecting the model most suitable for the problem, and ensuring the accuracy of the optimal product concentration prediction. Random forest (RF) is the best choice for this model.

3. Embedded Optimization Algorithm and Heuristic Search

Using the found RF optimal model (taking this model as an example), embedding the optimization algorithm, according to the input and output boundary conditions, automatically searching in a specific area to find the best combination of process conditions. Following key processes are included:

(1) Selection of optimization algorithm: selecting an appropriate optimization algorithm for searching the best process conditions in the multi-dimensional parameter space, such as gradient descent, genetic algorithm, particle swarm optimization or other heuristic algorithms.

(2) Definition of boundary conditions: clearly defining the boundary conditions of input parameters, limiting the search space, ensuring the process conditions within the acceptable range, and ensuring the feasibility of process implementation.

(3) Heuristic search: the optimization algorithm uses the heuristic search strategy to automatically search the best combination of process conditions according to the product concentration and boundary conditions predicted by the model, similar to the problem of finding the global optimal solution in the multi-dimensional space.

(4) Automatic iteration: the algorithm includes multiple model trainings and evaluations to continuously improve the proposal of process conditions. In each iteration, the algorithm tries different combinations of input parameters and transmits them to the trained model, and evaluates the quality of the solution according to the predicted product concentration and boundary conditions until the best combination of process conditions satisfying the optimization goal is found.

Finally, the set Z of characteristic parameter requirements of the proportioning feedstock, as follows:

$$Z = \begin{bmatrix} z_1 \\ z_2 \\ z_3 \\ z_4 \\ z_5 \\ z_6 \end{bmatrix} = \begin{bmatrix} 18380.7 \\ 5.6 \\ 1.46 \\ 5.33 \\ 965.47 \\ 178.6 \end{bmatrix},$$

where Z represents the set of characteristic parameter requirements of the proportioning feedstock; $z_1$ represents a calorific value requirement in the proportioning feedstock, and the unit is kJ/kg; $z_2$ represents a moisture content requirement in the proportioning feedstock, and the unit is %; $z_3$ represents a sulfur content requirement in the proportioning feedstock, and the unit is %; $z_4$ represents a chlorine content requirement in the proportioning feedstock, and the unit is %; $z_5$ represents a requirement of heavy metal zinc content in the proportioning feedstock, and the unit is mg/kg; $z_6$ represents a requirement of heavy metal lead content in the proportioning feedstock, and the unit is mg/kg.

Step 5: Calculating an Optimized Total Blending Ratio X'

According to the linear relationship between the proportioning feedstock, the solid wastes and the boiler/industrial kiln working feedstock, specific values are substituted to optimize X, and the optimized total blending ratio X' is obtained. The specific calculation is as follows:

$$XW + (1 - X)C = Z,$$

where X represents a proportion of total solid waste in the proportioning feedstock, the unit is %; W represents the set of the solid waste characteristic parameter requirements; C represents the set of the characteristic parameter requirements of the boiler/industrial kiln working feedstock; Z represents the set of the characteristic parameter requirements of the proportioning feedstock;

the above formula is expanded, and the corresponding values are substituted into the calculation:

$$XW_1 + (1 - X)c_1 \geq z_1$$
$$XW_2 + (1 - X)c_2 \leq z_2$$
$$XW_3 + (1 - X)c_3 \leq z_3$$
$$XW_4 + (1 - X)c_4 \leq z_4$$
$$XW_5 + (1 - X)c_5 \leq z_5$$
$$XW_6 + (1 - X)c_6 \leq z_6;$$

numerical values are substituted for solutions:

$$X \leq \frac{c_1 - z_1}{c_1 - W_{1min}} = \frac{29307.6 - 18380.7}{29307.6 - 133.36} = 0.6841$$

$$X \leq \frac{z_2 - c_2}{W_{2max-c_2}} = \frac{5.6 - 2.18}{5.6 - 0.0578} = 0.3448$$

$$X \leq \frac{z_3 - c_3}{W_{3max-c_3}} = \frac{1.46 - 0.972}{2.46 - 0.972} = 0.3280$$

$$X \leq \frac{z_4 - c_4}{W_{4max-c_4}} = \frac{5.33 - 0.001}{20.41 - 0.001} = 0.4257$$

$$X \leq \frac{z_5 - c_5}{W_{5max-c_5}} = \frac{965.47 - 0.00139}{2267.7 - 0.00139} = 0.5989$$

$$X \leq \frac{z_6 - c_6}{W_{6max-c_6}} = \frac{178.6 - 0.03439}{298.2 - 0.03439} = 26.11.$$

To sum up, in order to meet all characteristic parameter requirements in the boiler/industrial kiln at the same time, the optimized total blending ratio range X' is obtained by taking the intersection of the proportion X of total solid waste in the proportioning feedstock under the conditions of various parameter requirements.

X' ∈ [0, 0.2611].

Step 6: Calculating an Optimized Characteristic Parameter Requirements B' of the Solid Wastes The optimized total blending ratio range X' is substituted into the following formula $$X'B' + (1 - X')C = Z,$$

corresponding numerical are substituted for solutions, the optimized characteristic parameter requirements B' is obtained, and the specific results are as follows:

$$W' = \begin{bmatrix} W'_1 \\ W'_2 \\ W'_3 \\ W'_4 \\ W'_5 \\ W'_6 \end{bmatrix} = \begin{bmatrix} 0 \sim 3481.95 \\ 0.0578 \sim 3.989198 \\ 0.0096 \sim 0.7417892 \\ 0.0015 \sim 5.3292611 \\ 15.802 \sim 592.09647 \\ 0.273 \sim 77.86002 \end{bmatrix}.$$

Step 7: Calculating a Set P of Allowable Blending Ratio Range Between Solid Wastes The set A of the solid waste characteristic parameters is known, and the set W' of the optimized solid waste characteristic parameter requirements is known. Bring the sets A and W' are substituted into the formula of the blending ratio relation formula, and the set P of allowable blending ratio range between solid wastes is calculated, as follows:

$$A \cdot P = W',$$

where P represents the set P of blending ratio of the solid wastes, and the unit is %; A represents the set A of basic characteristic parameters of the solid wastes; W' represents the set of optimized solid waste characteristic parameter requirements;

known conditions are substituted and expanded to obtain:

$$\begin{bmatrix} 13335.7 & 1 \\ 12.1 & 5.78 \\ 0.96 & 2.46 \\ 0.15 & 20.41 \\ 1580.2 & 2267.7 \\ 27.3 & 298.8 \end{bmatrix} \begin{bmatrix} p_1 \\ p_2 \end{bmatrix} = \begin{bmatrix} 0\sim3481.95 \\ 0.0578\sim3.989198 \\ 0.0096\sim0.7417892 \\ 0.0015\sim5.3292611 \\ 15.802\sim592.09647 \\ 0.273\sim77.86002 \end{bmatrix},$$

where $p_1$ represents an allowable addition ratio of municipal sludge; $p_2$ represents an allowable dosage ratio of fly ash from waste incineration;

the maximum and minimum values in the set W' are taken respectively, and the ranges of $p_1$ and $p_2$ are calculated to obtain the allowable dosing ratio range of the solid wastes.

$p_1 \in [0.0036, 0.2282]$ $p_2 \in [0.0025, 0.2125]$.

The blending ratio method may provide guidance for the boiler/industrial kiln to cooperatively dispose of the solid wastes, and not only ensures the product quality of the boiler/industrial kiln, but also reduces the emission of pollutants under the normal working conditions of the boiler/industrial kiln. This proportion method provides a new direction for the research of solid waste proportion method.

The disclosure provides a new method of proportion. In the process of solid waste proportion, it is necessary to consider the calorific value, moisture, corrosive elements and heavy metal content, low melting point components and other resource or energy requirements in combination with the original working conditions.

The above is only the optional embodiment of the disclosure, but the protection scope of the disclosure is not limited to this. Any change or replacement that may be easily thought of by a person familiar with this technical field within the technical scope disclosed in the disclosure should be included in the protection scope of the disclosure. Therefore, the protection scope of the disclosure should be based on the protection scope of the claims.

What is claimed is:

1. A multivariate solid waste proportion optimization method, comprising:

obtaining initial characteristic parameters and proportioning feedstock, wherein the proportioning feedstock comprise solid waste and boiler/industrial kiln working feedstock, the initial characteristic parameters comprise: solid waste characteristic parameters set A, solid waste parameter set W, and a set C of parameter requirements of the boiler/industrial kiln working feedstock, $$A = \begin{bmatrix} a_{11} & a_{12} \\ a_{21} & a_{21} \\ a_{31} & a_{32} \\ a_{41} & a_{42} \\ a_{51} & a_{52} \\ a_{61} & a_{62} \end{bmatrix} = \begin{bmatrix} 13335.7 & 1 \\ 12.1 & 5.78 \\ 0.96 & 2.46 \\ 0.15 & 20.41 \\ 1580.2 & 2267.7 \\ 27.3 & 298.2 \end{bmatrix},$$

where $a_{n1}$ and $a_{n2}$ represent different types of solid wastes, 1 represents municipal sludge, and 2 represents fly ash from waste incineration; $a_{1n}$ represents a calorific value characteristic parameter of sludge and fly ash from waste incineration, and the unit is kJ/kg; $a_{2n}$ represents a moisture content characteristic parameter of sludge and fly ash from waste incineration, and the unit is %; $a_{3n}$ represents a sulfur content characteristic parameter in sludge and fly ash from waste incineration, and the unit is %; $a_{4n}$ represents a chlorine content characteristic parameter in sludge and fly ash from waste incineration, and the unit is %; $a_{5n}$ represents a characteristic parameter of heavy metal zinc content in sludge and fly ash from waste incineration, and the unit is mg/kg; and $a_{6n}$ represents a characteristic parameter of heavy metal lead content in sludge and fly ash from waste incineration, and the unit is mg/kg;

$$W = \begin{bmatrix} W_1 \\ W_2 \\ W_3 \\ W_4 \\ W_5 \\ W_6 \end{bmatrix} = \begin{bmatrix} 133.36\sim13335.7 \\ 0.0578\sim12.1 \\ 0.0096\sim2.46 \\ 0.0015\sim20.41 \\ 15.802\sim2267.7 \\ 0.273\sim298.2 \end{bmatrix},$$

where W represents the set of characteristic parameter requirements; $W_1$ represents a required range of calorific value in the solid wastes, and the unit is kJ/kg; $W_2$ represents a required range of moisture content in the solid wastes, and the unit is %; $W_3$ represents a required range of sulfur content in the solid wastes, and the unit is %; $W_4$ represents a required range of chlorine content in the solid wastes, and the unit is %; $W_5$ represents a required range of heavy metal zinc content in the solid wastes, and the unit is mg/kg; $W_6$ represents the required range of heavy metal lead content in the solid wastes, and the unit is mg/kg;

$$C = \begin{bmatrix} c_1 \\ c_2 \\ c_3 \\ c_4 \\ c_5 \\ c_6 \end{bmatrix} = \begin{bmatrix} 29307.6 \\ 2.18 \\ 0.972 \\ 0.001 \\ 0.00139 \\ 0.03439 \end{bmatrix},$$

where C represents the set of characteristic parameter requirements; $c_1$ represents a calorific value requirement of the boiler/industrial kiln working feedstock, and the unit is KJ/kg; $c_2$ represents a moisture content requirement of the boiler/industrial kiln working feedstock, and the unit is %; $c_3$ represents a sulfur content requirement in the boiler/industrial kiln working feedstock, and the unit is %; $c_4$ represents a chlorine content requirement in the boiler/industrial kiln working feedstock, and the unit is %; $c_5$ represents a requirement of heavy metal zinc content in the boiler/industrial kiln working feedstock, and the unit is mg/kg; $c_6$ represents a requirement of heavy metal lead content in the boiler/industrial kiln working feedstock, and the unit is mg/kg;

using a machine learning model embedded optimization algorithm to obtain a set Z of characteristic parameter requirements of the proportioning feedstock;

$$Z = \begin{bmatrix} z_1 \\ z_2 \\ z_3 \\ z_4 \\ z_5 \\ z_6 \end{bmatrix} = \begin{bmatrix} 18380.7 \\ 5.6 \\ 1.46 \\ 5.33 \\ 965.47 \\ 178.6 \end{bmatrix},$$

where Z represents the set of characteristic parameter requirements of the proportioning feedstock; $z_1$ represents a calorific value requirement in the proportioning feedstock, and the unit is kJ/kg; $z_2$ represents a moisture content requirement in the proportioning feedstock, and the unit is %; $z_3$ represents a sulfur content requirement in the proportioning feedstock, and the unit is %; $z_4$ represents a chlorine content requirement in the proportioning feedstock, and the unit is %; $z_5$ represents a requirement of heavy metal zinc content in the proportioning feedstock, and the unit is mg/kg; Ze represents a requirement of heavy metal lead content in the proportioning feedstock, and the unit is mg/kg;

obtaining an optimal blending ratio of the solid wastes and the boiler/industrial kiln working feedstock according to a mathematical relationship between the set of the characteristic parameter requirements of the proportioning feedstock, characteristic parameter requirements of the solid wastes and characteristic parameter requirements of the boiler/industrial kiln working feedstock;

obtaining an optimal set of solid waste characteristic parameter requirements according to the optimal blending ratio of the solid wastes and the boiler/industrial kiln working feedstock; and completing solid waste proportion based on the optimal set of the solid waste characteristic parameter requirements and a set of solid waste characteristic parameters;

wherein obtaining an optimized blending ratio comprises:

constructing a blending ratio formula according to the set of characteristic parameter requirements of the proportioning feedstock, the set of the characteristic parameter requirements of the solid wastes and the set of characteristic parameter requirements of the boiler/industrial kiln working feedstock;

substituting a maximum value and a minimum value of each subset in the set of the characteristic parameter requirements of the solid wastes and a corresponding subset in the set of characteristic parameter requirements of the boiler/industrial kiln working feedstock into the blending ratio formula, and optimizing the set of the characteristic parameter requirements of the solid wastes and the set of characteristic parameter requirements of the boiler/industrial kiln working feedstock to obtain the optimized blending ratio;

the blending ratio formula is:

$$XW + (1 - X)C = Z,$$

X represents a proportion of total solid waste in proportioning feedstock, and an unit is %; W represents the set of the characteristic parameter requirements of the solid wastes; & represents the set of characteristic parameter requirements of the boiler/industrial kiln working feedstock;

and Z represents the set of characteristic parameter requirements of the proportioning feedstock;

based on the optimal set of the optimal solid waste characteristic parameter requirements and the set of the solid waste characteristic parameters, completing the solid waste proportion comprises:

obtaining a set of solid waste blending ratio according to the optimal set of the solid waste characteristic parameter requirements and the set of the solid waste characteristic parameters;

obtaining an allowable solid waste blending ratio range according to the maximum and minimum values of the set of solid waste blending ratio and the optimal set of the solid waste characteristic parameter requirements, and completing the solid waste proportion.

2. The multivariate solid waste proportion optimization method according to claim 1, wherein obtaining the set of the characteristic parameter requirements of the proportioning feedstock comprises:

constructing an initial machine learning model;

optimizing the initial machine learning model to obtain a final machine learning model;

based on the final machine learning model, combining with the optimization algorithm, and obtaining the set of the characteristic parameter requirements of the proportioning feedstock.

3. The multivariate solid waste proportion optimization method according to claim 2, wherein steps of obtaining the final machine learning model comprise:

carrying out data preprocessing on the proportioning feedstock, training the initial machine learning model by using preprocessed data, and then carrying out a cross-validation on the models to obtain optimal hyperparameters of an algorithm; and obtaining the final machine learning model based on obtained optimal hyperparameters and by combining input parameters and output performance indexes of the initial machine learning model.

4. The multivariate solid waste proportion optimization method according to claim 3, wherein based on the final machine learning model and combining with the optimization algorithm, obtaining the set of the characteristic parameter requirements of the proportioning feedstock comprises:

obtaining a preset search space according to boundary conditions of the input parameters; and according to the final machine learning model, using the optimization algorithm and a heuristic search strategy, automatically searching in the preset search space, and obtaining the set of the characteristic parameter requirements of the proportioning feedstock through iteration.

* * * * *